Feb. 26, 1929.
H. A. HAMILTON
MILK BOTTLE CRATE
Filed Jan. 25, 1928
1,703,733
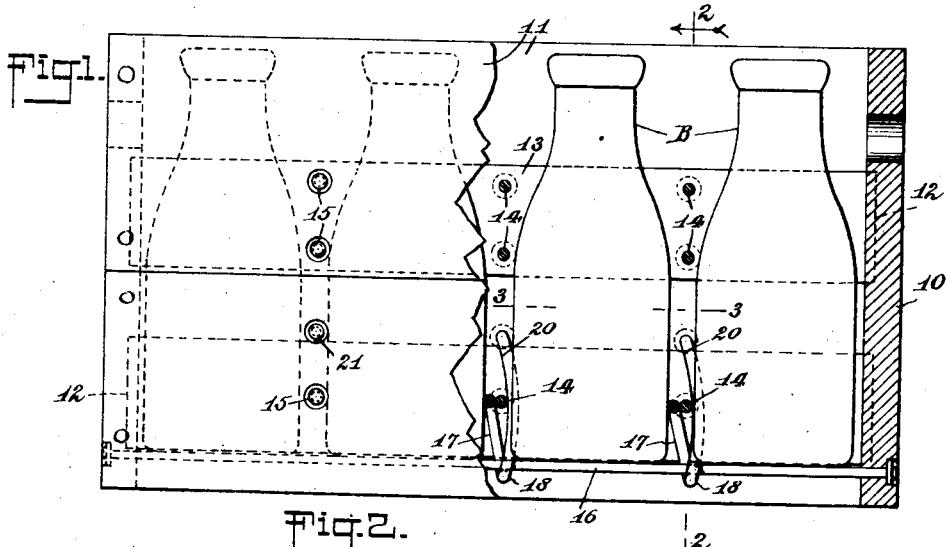
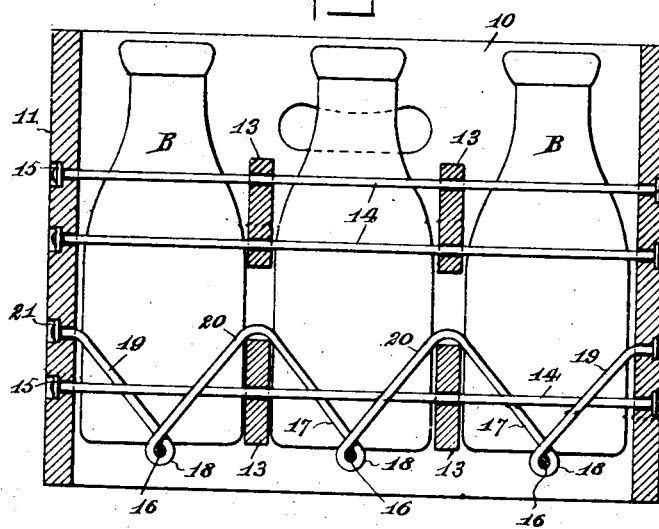
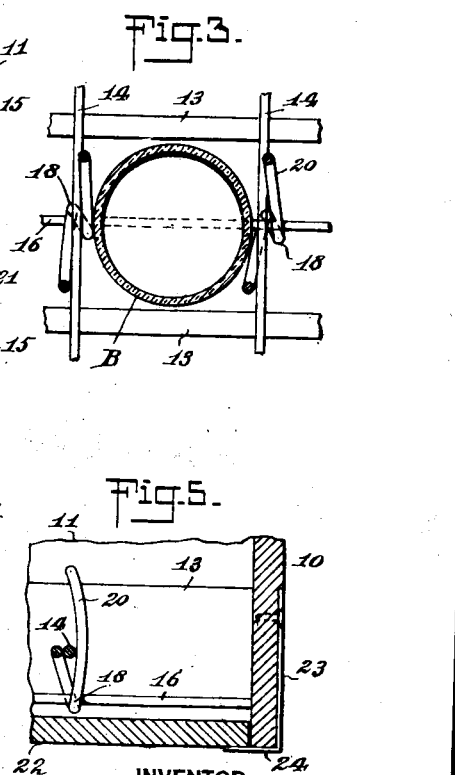
WITNESSES
William P. Goebel
Chris Feinle
INVENTOR
Henry A. Hamilton
BY
ATTORNEY Patented Feb. 26, 1929.

1,703,733

UNITED STATES PATENT OFFICE.

HENRY A. HAMILTON, OF JERSEY CITY, NEW JERSEY.

MILK-BOTTLE CRATE.

Application filed January 25, 1928. Serial No. 249,447.

This invention relates to the class of bottle carriers, crates and boxes, and relates particularly to articles of the indicated class adapted to hold milk bottles, whether for making deliveries or for washing the bottles when empty.

The principal object of the present invention is to provide a crate or box of the indicated character embodying improvements in construction rendering the crate or box more serviceable and durable for the intended purposes.

The nature of the invention and its distinguishing features and advantages will appear when the following specification is read in connection with the accompanying drawing, in which—

Figure 1 is a view of a bottle crate partly in elevation and partly in section, showing certain structural features of the present invention.

Fig. 2 is a sectional view taken on the line 2—2 of Fig. 1.

Fig. 3 is a sectional view taken on the line 3—3 of Fig. 1.

Fig. 4 is a sectional view showing a modification.

Fig. 5 is a sectional view taken on the line 5—5 of Fig. 4.

In the illustrated embodiment of the invention there is shown a crate including a hollow body consisting of end walls 10 and side walls 11, the latter of which may be formed of one or more parts connected at the ends respectively with the end walls 10, in any suitable manner. The end walls 10 and side walls 11 connected together form a rectangular hollow body open at the top and bottom. Each end wall 10 has recesses 12 therein. Rigid partition members 13 are arranged between the end walls 10, and opposite ends of each member 13 are respectively received in opposite recesses 12. The members 13 are incorporated when the end walls 10 and side walls 11 are brought together. The members 13 are arranged in spaced relationship, there being an upper pair and a lower pair immediately below the upper pair. Each of the members 13 is of wood and being held between the end walls 10 in the manner explained gives greater rigidity and effectively prevents detachment of the members 13. Groups of metal cross rods 14 are arranged in spaced relationship. Each cross rod has the opposite ends thereof respectively connected with the side walls 11 by arranging on each end a metal washer and then forming a head on the end as at 15. Each fastening is countersunk with respect to the side face of the wall 11. In the present instance two rods 14 of each group extend through the upper members 13, and one rod 14 of each group extends through the lower members 13, as shown most clearly in Fig. 2. The cross rods 14 serve with the members 13 to subdivide the crate body into compartments in which the bottles indicated at B may be arranged and held out of contact with each other. Bottle rest members or rods 16 are arranged at the bottom of the crate body. These rods 16 are also of metal and each has the opposite ends thereof respectively secured to the end walls 10 in the manner in which the rods 14 are secured. The rods 16 are parallel to the side walls 11 and members 13 and occur respectively between the said side walls 11 and members 13. The bottles B rest on the rods 16.

In order to truss up the rods 16 there are provided truss members or metal rods 17. Each truss rod is bent and formed from a single piece of material to provide eyes 18 and relatively diverging portions consisting of end portions 19 and intermediate connected portions providing V-shaped trusses 20. One of the truss rods 17 is associated with each of the lower cross rods 14 and has the opposite ends thereof respectively secured to the opposite side walls 11 as at 21. The eyes 18 respectively receive the rods 16, thus forming a connection between each truss rod 17 and all of the rods 16. The diverging portions of each rod 17 are alternately arranged at opposite sides of the related rod 14, and each truss 20 is in engagement or contact with one of the lower members 13, as shown most clearly in Fig. 2. In this way the bottle rest members or rods 16 are rigidly trussed up and kept from sagging or bending under the weight of the bottles.

The arrangement of partition members 13 and rods 14, 16 and 17 is such that the crate will be exceptionally serviceable, yet light in weight, and capable of being readily cleaned.

In Figs. 4 and 5 there is shown a modification consisting of the provision of a bottom 22 which is removably held in place by flat springs 23, there being a pair of springs 23 secured to each end wall 10, and each spring having a portion 24 engageable with the bottom, as shown most clearly in Fig. 5. In hot weather the filled bottles are packed with ice, and the bottom 22 serves to prevent the ice from falling out. The said bottom 22 may be readily removed when it is desired to use the crate without the bottom.

I claim:

1. A bottle crate including side and end walls, rigid partitions each having its opposite ends respectively engaged with said end walls, cross members arranged in spaced relationship and each having its opposite ends respectively secured to said side walls, bottle rest members arranged in spaced relationship and each having its opposite ends respectively secured to said end walls, and truss members each having its opposite ends respectively secured to said side walls, and each truss member formed so as to truss each of the rest members and to saddle certain of said partitions.

2. In a bottle crate, a crate body consisting of side and end walls; bottle rest members arranged in spaced relationship and each having its opposite ends respectively secured to said end walls, rigid members extending inside of the crate body, and truss members each having its opposite ends respectively secured to said side walls, and each truss member connected with each of said rest members and saddling said rigid members.

3. In a bottle crate, a crate body consisting of side and end walls; bottle rest rods arranged in spaced relationship at the bottom of said body, and rigid members connected with said body, and truss rods extending transversely with respect to said rest rods in spaced relationship, each truss rod bent and formed from a single piece of material to provide eyes and trussing portions connected with the eyes, the eyes respectively receiving therethrough the rest rods, said trussing portions disposed in contact with said rigid members, and the opposite ends of the truss rods respectively secured to said side walls.

4. In a bottle crate, a crate body consisting of wooden side and end walls; cross rods arranged in spaced relationship and each having its opposite ends respectively secured to said side walls, bottle rest rods arranged in spaced relationship and each having its opposite ends respectively secured to said end walls, and truss rods each bent and formed to provide eyes, end portions and V-shaped truss portions, the end portions of each truss rod respectively secured to the side walls, the rest rods respectively received in the eyes of the truss rods, and each cross rod extending between portions of one of the truss rods related thereto.

Signed at New York in the county of New York and State of New York this 23rd day of January, A. D. 1928.

HENRY A. HAMILTON.